United States Patent [19]

Spence-Bate et al.

[11] 4,208,119

[45] Jun. 17, 1980

[54] PHOTOGRAPHIC FILM DEVELOPER

[76] Inventors: Harry A. H. Spence-Bate, 1 Cheam Pl., Morley, Western Australia 6062; William W. Hargreaves, 11 Smarts Crescent, Cronula, New South Wales 2230, both of Australia

[21] Appl. No.: 946,425

[22] Filed: Sep. 27, 1978

[30] Foreign Application Priority Data

Sep. 30, 1977 [AU] Australia .............................. PD1895

[51] Int. Cl.[2] .............................................. G03B 3/10

[52] U.S. Cl. ...................................... 354/322; 134/76; 134/134; 198/342; 198/473

[58] Field of Search ............... 354/312, 315, 316, 319, 354/320, 321, 322, 323, 331, 335, 337, 338; 134/46, 48, 49, 63, 76, 77, 133, 134; 198/342, 473, 580, 680, 678; 214/317

[56] References Cited

U.S. PATENT DOCUMENTS

| | | | |
|---|---|---|---|
| 2,025,371 | 12/1935 | Beidler | 198/342 |
| 2,541,016 | 2/1951 | Allen | 354/320 |
| 2,545,031 | 3/1951 | Izzi | 198/342 |
| 2,934,000 | 4/1960 | Sardeson et al. | 134/76 |
| 2,980,006 | 4/1961 | Nieuwenhoven et al. | 354/316 |
| 3,087,406 | 4/1963 | Dutch | 354/322 |
| 3,258,103 | 6/1966 | Bontempi et al. | 198/473 |
| 3,349,688 | 10/1967 | Buechner | 354/316 |
| 3,469,517 | 9/1969 | Nishimoto | 354/322 |
| 3,624,728 | 11/1970 | Clark | 354/93 |
| 3,762,300 | 11/1973 | Hart et al. | 198/678 |

*Primary Examiner*—L. T. Hix

*Assistant Examiner*—Alan Mathews

*Attorney, Agent, or Firm*—Fidelman, Wolffe & Waldron

[57] ABSTRACT

A developer unit for sheet film in which individual sheets are moved through processing tanks by holders moved by an elevator from tank to tank and thence the sheets are disposed from the developer, the holders are recovered in the developer after disposal of the sheet film and are conveyed via a holder store to a film reception station where sheets are loaded individually with the holders for processing.

21 Claims, 1 Drawing Figure

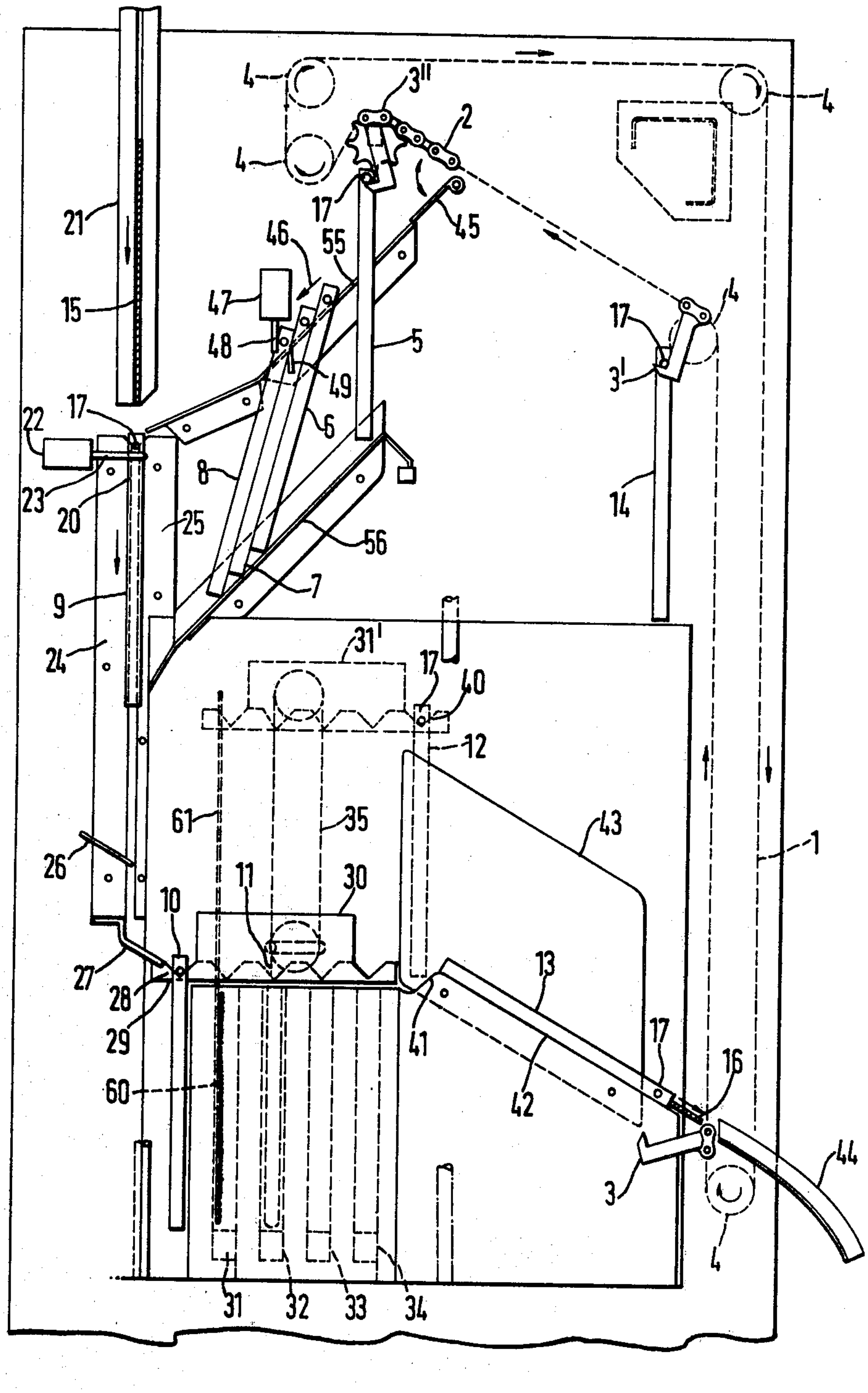
4
3''
2
4
4
4
17
45
21
46
55
47
17
4
15
48
5
3'
49
6
22
17
8
14
23
20
25
56
9
7
24
31'
17
40
12
61
35
43
1
26
11
30
10
13
27
28
41
29
42
17
16
60
44
3
4
31
32
33
34

PHOTOGRAPHIC FILM DEVELOPER

The present invention relates to a developer for sheet film, in particular for microfiche film. Microfiche cameras are designed to expose microfiche film laminae on a continuous basis. It is therefore advantageous to develop the film at a rate corresponding to the exposure rate of the film.

The primary object of the invention, therefore, is to provide a developer for sheet film which is enabled to continuously process the film corresponding to the exposure rate of film produced by a microfiche camera.

Another object of the invention is to provide a conveying apparatus suitable for conducting sheet film through a developer.

A developer according to the invention comprises a plurality of film holders each adapted to hold a film lamina, tanks for developing fixing and washing the film adapted to receive said film holders, releasing means for holding a said holder at a film receiving station for reception of a said lamina and releasing said holder after feeding a said lamina into a said holder, means for moving the said holder holding the lamina from the film receiving station to said tanks, means for removing said film holder holding the lamina from the tanks, release means at a release station for releasing the film from the holder, a conveyor between said release station and said receiving station being enabled to capture said holder after release of the film to return the holder to the receiving station.

Conveying apparatus according to the invention comprises a conveyor provided with a plurality of hook means arranged to engage on an article to be conveyed, each hook means being mounted rigidly to one link of a series of links forming a chain for said conveyor, said chain passing from an article collecting station upwardly and over a chain guide above a store and downwardly again over said chain guide whereby said hook means passing over said chain guide is caused to tip to release a said article into said store.

Still another object of the invention is to provide apparatus for shifting sheet film from one treating station, preferably a tank, to another treating station.

Apparatus for shifting sheet film in film holders from one treating station to another treating station arranged in lateral proximity to each other comprising an elevator having holder receiving notches displaced laterally along on an elevator member in corresponding alignment with the lateral direction of said stations, each holder having on each side towards its top and an open end at its top a projection engageable with said notches, the elevator being arranged to be raised by elevating means to withdraw a said holder from a treating station and the elevator being also arranged to be shifted laterally to move a withdrawn article from one said treating station to another said treating station.

Preferably, the developer has a film holder store with a retaining means allowing release of a holder to the receiving station, the conveyor being arranged to feed holders to the store.

Agitating means is preferably provided for at least the developing tank.

The invention will now be described with reference to the accompanying drawing which is a sectional side view of the developer according to the invention.

The developer shown in the drawing includes a conveyor 1 formed from chain links 2 to which are attached a plurality of hooks 3,3′,3″ (a fourth not being shown). The conveyor is driven by a motor (not shown) and passes around sprockets 4.

The conveyor 1 is arranged to carry ten film holders 5–14, each of which is formed of an open gride-like construction to enable developing fluid to freely circulate through it and having an open top so that in the case of holder 9 a microfiche film lamina 15 can be dropped into it and in the case of the downwardly facing holder 13 a film lamina 16 can drop out of it. Each holder has suspension lugs 17 on either side of the top.

The developer has a receiving station 20 aligned with a film inlet 21 in which film lamina 15 can be seen. At the receiving station 20 a solenoid 22 operating a movable stop 23 holds film holder 9 by means of one of its lugs 17. This enables the lamina 15 to drop into the holder's open top for retention by the holder. Either side of the holder 9 are slide members 24 and 25 which bear on the lugs 17. Towards the lower end of the members 24 and 25 is a first deflector plate 26 and at the bottom of the slide members is a second deflector plate or hanger end guide 27. The plates 26 and 27 act on the bottom of the holder and lugs respectively to lift the holder and deflect the holder into a receiving notch 28 of a lift bar 29 of an elevator 30.

The elevator 30 is arranged to lift the holders and lower them in order into a developer tank 31, a fixer tank 32, a wash tank 33 and a drier tank 34. This is in the case of black and white film. Further tanks totalling nine tanks are required for processing colour film. The tanks 31–34 are fed from the bottom by conduits which are not shown. The elevator 30 is raised by an elevator drive 35 driven by a motor (not shown) to a position 30′ so that the holders, one of which is shown at 12, are clear of the tank top.

In order to remove the holder 12 from the tanks the elevator 30 lifts holder 12 to position 31′ at which stage the holder is in the last notch 40 and slides towards the conveyor 1 until the bottom of the holder locates against ramp face 41 when the elevator lowers to disengage lug 17 from notch 40. The holder then falls onto downwardly facing ramp 42 into the position of holder 13 between ramp guide plates 43. Fiche 16 is then allowed to fall out of the holder onto exit chute 44. Holder 13 is then hooked by hook 3 on conveyor 1.

From the position of hook 3 the conveyor raises each holder through position of holder 14 past hinging gate 45 and releases the holders as at 5 into film holder store 46. In store 46 holders 6, 7 and 8 can be seen held by a retaining means comprising a solenoid 47 operating a movable detent stop 48 which traps holders against fixed stop 49. In the store 46 the holders 6–8 slide with their lugs 17 on hanger guide 55 and their bottoms on bottom guide 56.

On release from the store the holders are allowed to slide one by one down the guide 55 and 56 to receiving station 20.

In at least the developer tank 31 there is an agitator plate 60 actuated by a link 61 and a motor driven cam (not shown).

Whilst it is appreciated that the device specifically described is a developer, the invention in its broadest sense can be applied to other devices where articles may be treated at various stations for instance in a plating plant. Thus, the invention is not limited to the specific apparatus shown and described but is defined in and by the appended claims.

What is claimed is:

1. A developer for sheet film laminae comprising a plurality of film holders each adapted to hold a film lamina, tanks for developing, fixing, and washing the film adapted to receive said film holders, releasing means for holding a said holder at a film receiver station for reception of a said lamina and releasing said holder after feeding a said lamina into a said holder, means for moving the said holder holding the lamina from the film receiving station to said tanks, means for removing said film holder holding the lamina from the tanks and positioning said holder at a release station for capture by a conveyor, release means at said release station for releasing the film from the holder, a conveyor between said release station and a film holder store feeding said receiving station, said conveyor being adapted to engage and capture said holder after release of the film to return the holder to the film holder store, said store having retaining means allowing release of a holder to the receiving station.

2. A developer as claimed in claim 1 wherein each said holder is open to the flow of fluid around a said film lamina held in each said holder.

3. A developer as claimed in claim 1 wherein said conveyor is provided with a plurality of hook means arranged to engage with a hook receiving means on each said holder at said release station and to disengage from said hook receiving means at said store.

4. A developer as claimed in claim 3 wherein each hook means is mounted rigidly to a one link of a series of links forming a chain for said conveyor, said chain passing upwardly and over a chain guide above said store and downwardly again over said chain guide whereby a said hook means passing over said chain guide is caused to tip to release a said holder into said store.

5. A developer as claimed in claim 1 wherein said store is provided with a downwardly sloping holder guide having surfaces which engage with said film holders released from said conveyor, said guide surfaces directing the holders onto said store retaining means, and thence downwardly to said receiving station.

6. A developer as claimed in claim 5 wherein each holder is provided on each side with a projection forming a hook receiving means, which projections are arranged to engage with said holder guide.

7. A developer as claimed in claim 5 wherein said sloping holder guide is directed so as to guide said holders between downwardly directed guides forming means for moving a said holder holding a lamina from the film receiving station to said tanks.

8. A developer as claimed in claim 7 wherein at or towards the bottom end of said downwardly directed guides there is provided a deflector arranged to deflect the holder from the guide alignment laterally toward said tanks.

9. A developer as claimed in claim 1 wherein said means for removing said film holder from the tanks comprises an elevator having holder receiving notches displaced laterally on an elevator member, each holder having on each side towards its top and open end a projection engagable with said notches, the elevator being arranged to be raised by elevating means to withdraw a said holder from a said tank, and the elevator being also arranged to be shifted laterally to move a withdrawn holder towards the lower end of said conveyor at said release station.

10. A developer as claimed in claim 9 wherein between said elevator and said conveyor there is provided a retaining device engagable with the lower end of a said holder after withdrawal from a said tank so that on release of a said holder by the elevator the holder is caught at its lower end and biased away from said conveyor whilst the upper open end of the holder on release falls towards said conveyor whereby a said lamina contained in the holder falls out of the holder for disposal from the developer and the holder drops to a position adjacent said conveyor for collection by said conveyor.

11. A developer as claimed in claim 9 wherein said elevating means comprises an elongate elevator conveyor the long sides of which are approximately vertical the length of the long sides being about the height of said holders when in the tanks, said elevator conveyor being pivotally connected to said elevator and the elevator being constrained so that said holder receiving notches remain approximately horizontal during movement of the elevator conveyor, the horizontal displacement of the long sides of the elevator conveyor causing corresponding lateral shift of the elevator.

12. A developer as claimed in claim 11 wherein said tanks are each spaced apart at distances equal to said horizontal displacement of the long sides of the elevator conveyor whereby each full rotation of the elevator conveyor shifts a holder from one tank to the next tank.

13. A developer as claimed in claim 12 wherein said tanks comprise in order a developer tank, a fixer tank, a wash tank and a drier tank, means being provided to feed developing, fixing, washing and drying media to the appropriate tanks.

14. A developer as claimed in claim 13 wherein said developer tank is provided with agitating means.

15. Conveying apparatus including a conveyor, an article collecting station, an article store and a treating station having a plurality of substations, said conveyor provided with a plurality of hook means arranged to engage on an article to be conveyed, each hook means being mounted rigidly to one link of a series of links forming a chain for said conveyor, said chain passing from said article collecting station to said article store upwardly from said collecting station and further passing over a chain guide above said article store and downwardly again over said chain guide whereby said hook means passing over said chain guide are caused to tip to release a said article into said store, means adjacent the lower end of said conveyor at said treating station for removing said articles from the treating station and transferring said articles to the collecting station for engagement with said hook means, said removal means comprising an elevator having article receiving notches displaced laterally on an elevator member, each article comprising a frame adapted to hold a lamina and having an open end at its top and having on each frame side toward its top a projection engageable with said notches, the elevator being arranged to be raised by elevating means to withdraw a said article from a treating substation and the elevator being also arranged to be shifted laterally to move a withdrawn article toward the lower end of said conveyor.

16. Apparatus as claimed in claim 15 including an article replenishing station wherein said article store is provided with a downwardly sloping guide having surfaces which engage with said articles released from said conveyor, said guide surfaces directing the articles onto an article store retaining means and thence downwardly to said article replenishing station.

17. Apparatus as claimed in claim 16 wherein said downwardly sloping guide is directed so as to guide said articles between downwardly directed slide members at the article replenishing station at which there is also provided releasing means for holding a said article during replenishment with a load and releasing said article after replenishment.

18. Apparatus as claimed in claim 17 wherein at or towards the bottom end of said downwardly directed slide members there is provided a deflector arranged to deflect said articles from the guide alignment laterally toward said treating station.

19. Apparatus as claimed in claim 15 wherein between said elevator and said conveyor there is provided a retaining device engageable with the lower end of a said article after withdrawal from said treating station so that on release of a said article by the elevator the article is caught at its lower end and is tilted away from said conveyor while the upper open end of the article on release falls towards said conveyor whereby the contents of the article is enabled to fall out of the article for disposal and the article drops to a position adjacent the conveyor for collection by the conveyor.

20. Apparatus for shifting sheet film in film holders from one treating station to another treating station arranged in lateral proximity to each other, comprising an elevator having holder receiving notches displaced laterally along on an elevator lift bar member in corresponding alignment with the lateral direction of said stations, each holder having an open end at its top and having a projection on each side towards its top engageable with said notches, the elevator being arranged to be raised by elevating means to withdraw a said holder from a treating station and the elevator being also arranged to be shifted laterally to move a withdrawn holder from one said treating station to another said treating station and to remove a withdrawn holder from the treating station, downwardly sloping ramp means adjacent said treating station, said ramp means including a retaining device engageable with the lower end of a holder after withdrawal from said treating station so that on release of said holder by the elevator, the holder falls top end first down said ramp whereby the sheet film contained in said holder is discharged therefrom.

21. Apparatus as claimed in claim 20 wherein at least one treating station is provided with a tank into which a said holder is dipped by said elevator.

* * * * *